United States Patent Office 3,157,673
Patented Nov. 17, 1964

3,157,673
PROCESS FOR THE PREPARATION OF THIO-
PHENE-2,5-DICARBOXYLIC ACID
Peter Liechti, Binningen, Adolf Emil Siegrist, Basel, and
Erwin Maeder, Muenchenstein, Switzerland, assignors
to Ciba Limited, Basel, Switzerland, a company of
Switzerland
No Drawing. Filed Dec. 19, 1961, Ser. No. 160,650
Claims priority, application Switzerland, Dec. 23, 1960,
14,394/60
8 Claims. (Cl. 260—332.2)

The present invention provides a process for the manufacture of thiophene-2,5-dicarboxylic acid, wherein an alkali metal salt or alkaline earth metal salt of $\alpha,\alpha'$-dichloroadipic acid is reacted in an aqueous medium, preferably without intermediate isolations, with an alkali metal sulfide, the resulting salt of tetrahydrothiophene-2,5-dicarboxylic acid is converted into the free dicarboxylic acid, the tetrahydrothiophene-2,5-dicarboxylic acid is treated in an acidic medium with molecular chlorine and from the resulting chlorination product hydrogen chloride is eliminated, likewise in an acidic medium.

Particularly good results are obtained by using for the reaction of the salts of $\alpha,\alpha'$-dichloradipic acid with the alkali metal sulfide a concentrated aqueous solution of dialkali metal salt or alkaline earth metal salt of $\alpha,\alpha'$-dichloroadipic acid and a concentrated aqueous solution of the alkali metal sulfide, carrying out the reaction at an elevated temperature, preferably at about 90 to 100° C., and using for every molecular proportion of the $\alpha,\alpha'$-dichloroadipate advantageously about 1 molecular proportion of the alkali metal sulfide. It is of advantage to conduct the reaction in a manner such that after bringing the reactants together, the reaction mixture contains per molecular proportion of dichloroadipic acid 300 to 750 parts of water. When, for example, a mixture of a concentrated aqueous solution of the dialkyl metal salt, more especially of a disodium salt, of $\alpha,\alpha'$-dichloroadipic acid and a concentrated aqueous solution of the alkali metal sulfide (for example sodium sulfide) is heated for some time at an elevated temperature of about 90 to 100° C., there is obtained an aqueous mixture which contains the resulting dialkali metal salts of tetrahydrothiophene-2,5-dicarboxylic acid.

For conversion of the resulting salts of tetrahydrothiophene-2,5-dicarboxylic acid into the free dicarboxylic acid, it is of advantage in performing the present process to cool the resulting aqueous mixture and then to acidify it with a mineral acid, for example with concentrated sulfuric acid, to a pH value below 4. The free tetrahydrothiophene-2,5-dicarboxylic acid obtained in this manner can be isolated, for example, by extraction with a suitable organic solvent (for example with ethyl acetate) and evaporation of the extract, followed by treatment with molecular chlorine in an acidic aqueous medium. It is, however, preferable to subject the free tetrahydrothiophene-2,5-dicarboxylic acid present in the acidic aqueous mixture directly to the treatment with molecular chlorine, without prior isolation.

The treatment of tetrahydrothiophene-2,5-dicarboxylic acid with molecular chlorine is advantageously carried out at a temperature below 40° C., preferably at about 10 to 20° C.

According to the present process hydrogen chloride is then eliminated from the chlorination product formed, this reaction likewise being performed in an acidic aqueous medium. Advantageously, the acidic aqueous mixture, resulting from the treatment of tetrahydrothiophene-2,5-dicarboxylic acid with molecular chlorine, is heated for some time at about 90 to 100° C., if desired in the presence of an acidic agent capable of splitting off hydrogen chloride, then cooled, and the thiophene-2,5-dicarboxylic acid is isolated from the reaction mixture.

A preferred variant of the present process can be represented, for example, by the following diagram:

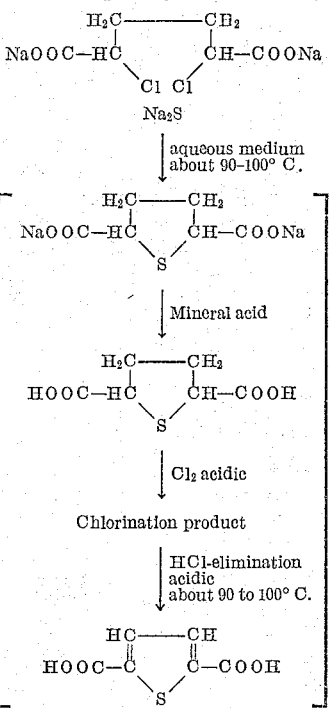

Unless otherwise indicated, parts and percentages in the following examples are by weight.

Example 1

430 parts (2 mols) of $\alpha,\alpha'$-dichloroadipic acid are dissolved at a temperature below 30° C. in a solution of 240 parts (2.27 mols) of anhydrous sodium carbonate in 600 parts of water. The weakly alkaline solution is cooled to 20° C., and a solution, heated at 90 to 95° C., of 236 parts (2 mols) of sodium sulfide of 66.5% strength in 140 parts of water is rapidly and vigorously stirred in. When all of the sodium sulfide has been added, the temperature rises rapidly, and after about one minute the mixture boils vigorously. The whole is left to itself until the temperature has dropped to 70° C., then cooled in an ice bath to 20° C. and acidified below 30° C. with about 77 parts of concentrated sulfuric acid to a pH value below 4. In the course of about one hour 280 parts (4 mols) of chlorine are injected into the solution which contains a substantial amount of undissolved inorganic salts, while maintaining the mixture below 20° C. by cooling it in an ice bath. On completion of the chlorination the whole is heated within 15 to 20 minutes to about 90° C. The mixture heats up to about 96 to 98° C. and in 2 to 5 minutes a weakly exothermic evolution of hydrogen chloride takes place, whereupon thiophene-2,5-dicarboxylic acid forms a light-brown precipitate. After cooling to 40° C., the batch is suction-filtered, the residue washed with much water until it is free from salts and dried under vacuum at 80° C. until its weight remains constant. Yield: about 145 to 150 parts of crude thiophene-2,5-dicarboxylic acid in the form of a light greyish brown powder which is dissolved in about 1800 parts by volume of N-sodium hydroxide solution, clarified with active carbon, acidified with sulfuric acid, washed and dried, to yield about 130 to 135 parts of thiophene-2,5-dicarboxylic acid in the form of a white powder which melts at about 320° C. (uncorrected) with partial sublimation. The yield is 37.8 to 39.3% of the theoretical, calculated through all reaction stages for dichloroadipic acid as starting material and thiophene-2,5-dicarboxylic acid as final product.

*Example 2*

107.5 parts of a mixture of stereoisomers of α,α'-dichloroadipic acid (melting at 129 to 158° C.) are dissolved in a solution of 53 parts of anhydrous sodium carbonate in 150 parts of water. A hot solution of 73 parts of commercial sodium sulfide of 70% strength in 40 parts of water is stirred into the first-named solution, whereupon the reaction mixture heats up without external heat being supplied. The batch is stirred on until the temperature has dropped in about 70° C. without external cooling, then cooled to an ice-sodium chloride bath, and the mixture is treated with 80 parts by volume of concentrated sulfuric acid at a rate such that the temperature does not exceed 40° C. Extraction with ethyl acetate, clarifying of the extract with active carbon, drying with anhydrous sodium sulfate and evaporation yields about 74 parts of a colorless, viscous oil which on being left to itself turns into a hard, colorless crystalline substance. After having been recrystallized from hot methyl-ethyl ketone it yields a mixture of cis- and trans-tetrahydrothiophene-2,5-dicarboxylic acid in the form of colorless crystals melting at 125–135° C.

*Analysis.*—$C_6H_8O_4S$—

|  | C, Percent | H, Percent |
| --- | --- | --- |
| Calculated | 40.90 | 4.58 |
| Found | 40.94 | 4.74 |

Tetrahydrothiophene-2,5-dicarboxylic acid can also be manufactured in the following manner:

43 parts of α,α'-dichloroadipic acid in 60 parts of ice water are neutralized with 22 parts of calcium carbonate, and this solution is mixed with a solution, heated at 95° C., of 23.6 parts of sodium sulfide of 66.1% strength in 14 parts of water. The temperature rises rapidly to the boiling point, and it is then allowed to drop to 70° C., the batch is acidified with concentrated sulfuric acid while cooling indirectly with ice, the suspension is exhaustively extracted with ethyl acetate and the extracts are dried with sodium sulfate and evaporated. On recrystallization from methylethyl ketone the colorless crystallisate yields about 22.5 parts of tetrahydrothiophene-2,5-dicarboxylic acid which is substantially free from chlorine and melts at 129–135° C.

176 parts of tetrahydrothiophene-2,5-dicarboxylic acid are dissolved in water to give a volume of 600 parts. While stirring this solution well, 140 parts of chlorine are injected into it in the course of about 30 minutes, while cooling in an ice bath to below 20° C. On completion of the chlorination the mixture is heated within about 10 minutes to 90° C., whereupon it heats up slightly to about 100° C. and a weakly exothermic evolution of hydrogen chloride sets in, and the resulting thiophene-2,5-dicarboxylic acid precipitates in the form of a yellowish powder. After cooling to 40° C., suction-filtration, washing and drying there are obtained about 95 parts of crude thiophene-2,5-dicarboxylic acid which turns brown at 220° C. and melts above 300° C. while turning black. The product is dissolved in about 1200 parts by volume of N-sodium hydroxide solution, clarified with active carbon, acidified with sulphuric acid, washed and dried, to yield about 85 parts of thiophene-2,5-dicarboxylic acid in the form of a white powder which melts at about 320° C. (uncorrected) with partial sublimation.

What is claimed is:

1. Process for the manufacture of thiophene-2,5-dicarboxylic acid, which comprises treating tetrahydrothiophene-2,5-dicarboxylic acid in aqueous mineral acidic medium with molecular chlorine and then splitting off hydrogen chloride from the resulting chlorination product in the aqueous mineral acidic medium at an elevated temperature.

2. Process for the manufacture of thiophene-2,5-dicarboxylic acid, which comprises treating tetrahydrothiophene-2,5-dicarboxylic acid in aqueous mineral acidic medium at a temperature below 40° C. with molecular chlorine and then splitting off hydrogen chloride from the resulting chlorination product in the aqueous mineral acidic medium at an elevated temperature.

3. Process for the manufacture of thiophene-2,5-dicarboxylic acid, which comprises treating tetrahydrothiophene-2,5-dicarboxylic acid in aqueous mineral acidic medium at a temperature ranging from 10 to 20° C. with molecular chlorine and then splitting off hydrogen chloride from the resulting chlorination product in the aqueous mineral acidic medium at an elevated temperature ranging from 90 to 100° C.

4. Process for the manufacture of thiophene-2,5-dicarboxylic acid, which comprises treating tetrahydrothiophene-2,5-dicarboxylic acid in aqueous sulfuric acidic medium with molecular chlorine and then splitting off hydrogen chloride from the resulting chlorination product in the aqueous sulfuric acidic medium at an elevated temperature.

5. Process for the manufacture of thiophene-2,5-dicarboxylic acid, which comprises treating tetrahydrothiophene-2,5-dicarboxylic acid in aqueous mineral acidic medium with molecular chlorine and then splitting off hydrogen chloride from the resulting chlorination product in the aqueous mineral acidic medium at an elevated temperature, the said process being performed without intermediate isolations.

6. Process for the manufacture of thiophene-2,5-dicarboxylic acid, which comprises treating tetrahydrothiophene-2,5-dicarboxylic acid in the aqueous mineral acidic medium at a temperature below 40° C. with molecular chlorine and then splitting off hydrogen chloride from the resulting chlorination product in the aqueous mineral acidic medium at an elevated temperature, the said process being performed without intermediate isolations.

7. Process for the manufacture of thiophene-2,5-dicarboxylic acid, which comprises treating tetrahydrothiophene-2,5-dicarboxylic acid in aqueous mineral acidic medium at a temperature ranging from 10 to 20° C. with molecular chlorine and then splitting off hydrogen chloride from the resulting chlorination product in the aqueous mineral acidic medium at an elevated temperature ranging from 90 to 100° C., the said process being performed without intermediate isolations.

8. Process for the manufacture of thiophene-2,5-dicarboxylic acid, which comprises treating tetrahydrothiophene-2,5-dicarboxylic acid in aqueous sulfuric acidic medium with molecular chlorine and then splitting off hydrogen chloride from the resulting chlorination product in the aqueous sulfuric acidic medium at an elevated temperature, the said process being performed without intermediate isolations.

References Cited in the file of this patent

FOREIGN PATENTS 405,017    Germany _____ Feb. 14, 1925

OTHER REFERENCES

Turner et al.: Jour. Org. Chem., vol. 14, pp. 476–9 (1949).

Runge et al.: Jour. Prakt Chem. [4], 2, 279–92 (1955).

Noller: Textbook of Organic Chemistry, second edition, 1958, pp. 114–15.